(No Model.)
G. E. RAYMOND.
VEHICLE SPRING.
No. 433,367. Patented July 29, 1890.
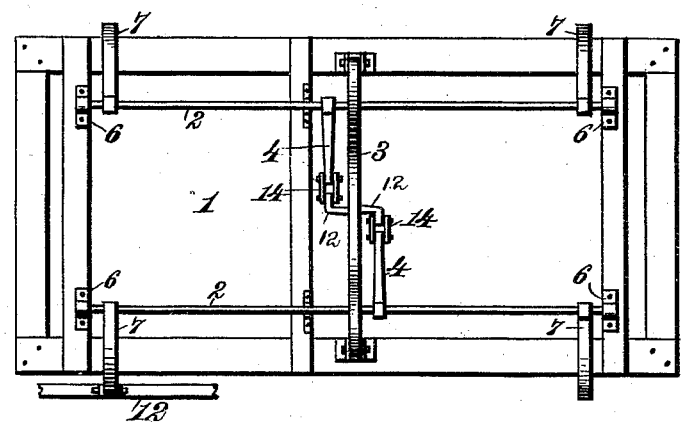
Fig. 1.
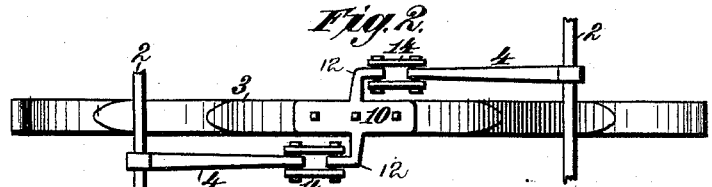
Fig. 2.
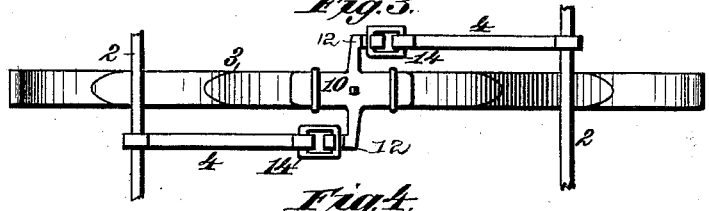
Fig. 3.
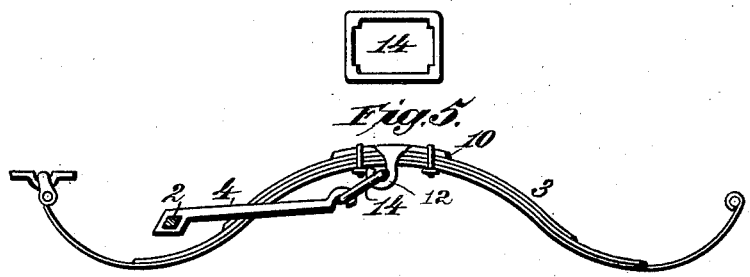
Fig. 4.
Fig. 5.
Witnesses:
Robt Everett
Lewis Lumby
Inventor:
George E. Raymond.
By Edward Taggart,
Atty.

UNITED STATES PATENT OFFICE.

GEORGE E. RAYMOND, OF GRAND RAPIDS, MICHIGAN.

VEHICLE-SPRING.

SPECIFICATION forming part of Letters Patent No. 433,367, dated July 29, 1890.

Application filed February 5, 1890. Serial No. 339,271. (No model.)

*To all whom it may concern:*

Be it known that I, GEORGE E. RAYMOND, a citizen of the United States, residing at the city of Grand Rapids, in the county of Kent and State of Michigan, have invented certain new and useful Improvements in Vehicle-Springs, of which the following is a specification.

This invention has for its object to provide novel, simple, and efficient means for supporting the body of a wheeled vehicle; and to accomplish this object my invention involves the features of construction, the combination, or arrangement of devices, and the principles of operation hereinafter described and claimed, reference being made to the accompanying drawings, in which—

Figure 1 is a plan view of an inverted vehicle-body, to which my spring is attached. Fig. 2 is a top view of the spring, showing the connection of the inner portion of the arms with the longitudinal rods. Fig. 3 is a view of the same part shown in Fig. 2, with a modified form of attachment between the inner arms and the central portion of the spring. Fig. 4 shows an enlarged view of the link used in the modified form, and Fig. 5 shows a side elevation of the spring, having at one end a modified form of attachment to the side bar.

Similar figures refer to similar parts throughout the several views.

1 represents the vehicle-body constructed in the ordinary manner.

2 represents parallel side rods, of any suitable shape, extending longitudinally of the vehicle-body in such a manner that the rods may rotate in such lugs. In Fig. 1 I have shown each rod supported in three places, the supports being shown by 6 6 6, &c. It is evident that a greater or less number of supports might be used without departing from the spirit of my invention.

7 7, &c., are arms extending from the rods 2 2 outwardly, the outer ends of which are supported by the side bars, one side bar being shown in Fig. 1 by 12, the connection to the side bar being in the ordinary form. These arms 7 7 are attached rigidly to the rods 2 2.

4 4 are two inwardly-extending transverse arms, also rigidly attached to the rods 2 2, and connected by suitable shackles to a spring-plate or iron 10. The spring-plate or iron 10 has a laterally-projecting lug 12 on either side. To each lug is attached the inner end of one of the transverse arms 4 by means of a shackle attachment. In Fig. 1 I have shown this shackle attachment by means of an ordinary shackle and bolts, the same being marked 14 14. The same method of attachment is also shown in Fig. 2; but in Fig. 3 I have shown a link so constructed as to be hooked upon the arm 4, the latter form of which I deem preferable. The spring 3 virtually supports the body of the vehicle. The spring-plate 10 being placed substantially at the center of the spring, the transverse arms 4 4 will bear or exert pressure upon the center. The connection between the arms 4 4 and the outwardly-extending arms 7 7 is made by virtue of the rod 2, so that two of the arms 7, together with one of the arms 4, practically make a continuous arm extending from the shackle in the spring-plate to the side bar. In Fig. 5 I have shown a shackle attachment between the end of the spring 3 and the body, which shackle attachment is shown by 11. In case the spring 3 is sufficiently curved, the shackle attachment is unnecessary; but in case it is made straight or with a comparatively small curve, the shackle attachment would be desirable, in order to allow for the free play of the central portion of the spring and the parts connected therewith.

The object of the invention is particularly directed to the use of a single spring with arms on either side, each arm extending either in a direct line or through suitable connections with the spring-plate to the side bars of the vehicle, turning upon a bearing between the side bars and the shackle-connection to the spring-plate.

Having thus described my invention, what I claim is—

1. In a vehicle, the combination, with the body, of the longitudinal side rods, a transverse spring connected at its ends with the opposite sides of the body and having at or near its center a spring-plate provided at each side with a laterally-projecting lug, and a pair of transverse arms arranged, respectively, at opposite sides of the transverse spring, and connected at their outer ends to the longitudinal side rods and at their inner ends to the lateral lugs on the spring-plate, substantially as described.

2. In a vehicle, the combination, with the body, of the rotating longitudinal side rods journaled at their ends to the body, the side bars of the vehicle connected with the rotating side rods, the transverse spring connected at its ends with the opposite sides of the body and having at or near its center a spring-plate provided at each side with a laterally-projecting lug, a shackle secured to each of said lugs, and a pair of transverse arms arranged, respectively, at opposite sides of the transverse spring, and connected at their outer ends to the side rods and at their inner ends to the shackles on the lateral lugs, substantially as described.

In witness whereof I have hereunto set my hand and seal in the presence of two witnesses.

GEO. E. RAYMOND. [L. S.]

Witnesses:
EDWARD TAGGART.
HUGH E. WILSON.